United States Patent
Brockett et al.

(10) Patent No.: US 6,702,463 B1
(45) Date of Patent: Mar. 9, 2004

(54) COMPLIANT FOIL THRUST BEARING

(75) Inventors: Theodore S. Brockett, Gilbert, AZ (US); Murali Chinta, Woodland Hills, CA (US); Dennis H. Weissert, Simi Valley, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 353 days.

(21) Appl. No.: 09/714,349

(22) Filed: Nov. 15, 2000

(51) Int. Cl.[7] ............................................. F16C 32/06
(52) U.S. Cl. ............................. 384/105; 384/103
(58) Field of Search ........................... 384/103, 105, 384/106

(56) References Cited

U.S. PATENT DOCUMENTS

| | | | |
|---|---|---|---|
| 4,277,112 A | 7/1981 | Heshmat | |
| 5,110,220 A | 5/1992 | Gu | 384/105 |
| 5,248,205 A | 9/1993 | Gu et al. | 384/106 |
| 5,318,366 A | 6/1994 | Nadjafi | 384/106 |
| 5,529,398 A | 6/1996 | Bosley | 384/105 |
| 5,833,369 A | 11/1998 | Heshmat | 384/105 |
| 5,871,284 A | 2/1999 | Nadjafi et al. | 384/105 |
| 5,918,985 A | 7/1999 | Bosley | 384/106 |
| 5,961,217 A | 10/1999 | Heshmat | 384/105 |

Primary Examiner—Thomas R. Hannon (57) ABSTRACT

A compliant foil fluid thrust bearing has a single sided or two sided thrust disk rotor, an integrally formed compliant foil member, and an underspring member. The non-rotating but compliant foils are located adjacent to the thrust face or faces or the rotatable disk and are formed as arcuate segments on washer-shaped disk members. The underspring member consists of three washer-shaped disk elements that together provide variable spring stiffness in both the circumferential and radial directions.

42 Claims, 10 Drawing Sheets

COMPLIANT FOIL THRUST BEARING

TECHNICAL FIELD

This invention relates to the general field of compliant foil fluid film bearings.

BACKGROUND OF THE INVENTION

Compliant foil fluid film thrust bearings are currently being utilized in a variety of high speed rotor applications. These rotor bearing systems generally include a two sided thrust disk rotating element, non-rotating compliant foil members that axially enclose the rotating element, non-rotating compliant underspring members that axially enclose the foil members, and a non-rotating thrust plate element and a non-rotating housing element that axially enclose and provide attachments for the foil members. The space between the rotating element and the thrust plate element on one side of the thrust disk and the space between the rotating element and the thrust surface of the housing element on the other side of the thrust disk are filled with fluid (such as air, natural gas or LPG) that envelops the foils.

The rotary motion of the rotating element applies viscous drag forces to the fluid and induces circumferential flow of the fluid between the smooth surface of the rotating element and the foil. The space between the rotating element and the compliant foil is subdivided into a plurality of fluid-dynamic wedge channels. Leading ramps of the compliant foil pads relative to the fluid's circumferential flow and a smooth surface of the rotating element form the two primary surfaces of the converging wedge channels. Trailing edge and the smooth surface of the rotating element form the primary surfaces of the diverging wedge channels.

Fluid flowing circumferentially along a converging wedge channel experiences steadily decreasing flow area, increasing circumferential flow velocity and static fluid pressure. If the rotating element moves toward the non-rotating element, the flow area along the wedge channel decreases, causing the fluid pressure differential along the channel to increase. If the rotating element moves away, the pressure differential along the wedge channel decreases. Thus, the fluid in the wedge channels exerts restoring forces on the rotating element that vary with, and stabilize running clearances, and prevent contact between the rotating and non-rotating elements of the rotor bearing system. Flexing and sliding of the bearing foils cause coulomb damping of any axial or overturning motion of the rotating element of the rotor bearing system.

Compliant foil fluid film thrust bearings operate with extremely small running clearances. The clearances between the compliant foil's converging channel ramp trailing ends and the rotating thrust disk are typically less than 100 micro-inches (2.5 micrometers) when the bearing is heavily loaded at operating conditions. Furthermore, the use of these thrust bearings results in moderate drag and power consumption.

Compliant foil fluid film thrust bearings tend to rely on backing or undersprings to preload the compliant foils against the rotating thrust disk so as to control foil position/nesting and to ensure rotor dynamic stability. The bearing starting torque (which should ideally be zero) is directly proportional to these preload forces and/or gravity forces. These preload forces also significantly increase the thrust disk speed at which the hydrodynamic effects in the wedge channels are strong enough to lift the rotating element of the rotor bearing system out of physical contact with the non-rotating members of the rotor bearing system. These preload forces and the high lift-off/touch-down speeds result in significant bearing wear each time the disk is started or stopped. This wear can generally be reduced significantly by coating the compliant foil members with solid film lubricants.

SUMMARY OF THE INVENTION

In accordance with a preferred embodiment of the present invention, a method for rotatably supporting a thrust disk on a thrust plate provides a compliant foil thrust bearing between the thrust disk and the thrust plate, and mounting an underspring member between the compliant foil member and the thrust plate to provide variable spring stiffness to the annular compliant foil member in both circumferential and radial directions. In another embodiment, a compliant foil fluid film thrust bearing includes a thrust disk rotatably supported by a non-rotating thrust bearing surface, and a compliant foil thrust bearing is operably disposed between the thrust disk and the non-rotating thrust bearing surface and mounted on the thrust bearing surface, the compliant foil thrust bearing includes a compliant foil member and an underspring member mounted on the thrust bearing surface and disposed between the thrust bearing surface and compliant foil member, the underspring member includes means to provide variable spring stiffness to the annular compliant foil member in both the circumferential and radial directions. Various shapes and configurations of the bearing members are illustrated and described.

BRIEF DESCRIPTION OF THE DRAWINGS

Having thus described the present invention in general terms, reference will now be made to the accompanying drawings in which:

DETAILED DESCRIPTION OF THE PREFERRED EMBODIMENTS

Figure 1:
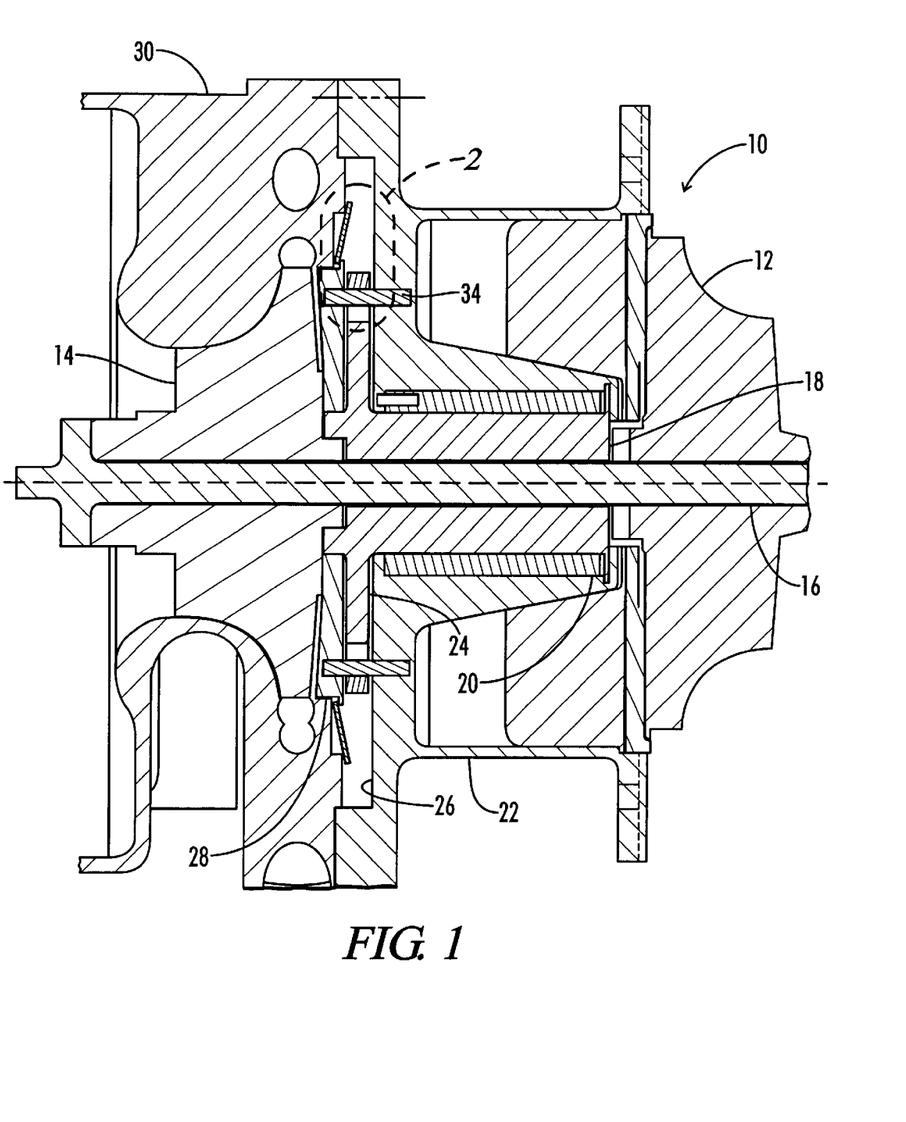
FIG. 1 is a sectional view of a turbomachine including a fluid film thrust bearing according to the present invention.

A turbomachine utilizing the fluid film thrust bearing of the present invention is illustrated in FIG. 1. The turbomachine 10 generally includes a turbine wheel rotor 12 and a compressor wheel rotor 14 at opposite ends of a common shaft or tie bolt 16. The thrust and radial bearing rotor 18 is disposed around the tie bolt 16 between the turbine wheel rotor 12 and the compressor wheel rotor 14. A journal bearing cartridge 20 in center bearing housing 22 supports the bearing rotor 18.

The compressor end of the bearing rotor 18 includes a radially extending thrust disk 24 which extends into a recess 26 in the compressor end of the center bearing housing 22. A bearing thrust plate 28 is disposed on the opposite side of the bearing rotor thrust disk 24. The outer periphery of the compressor end of the center bearing housing 22 engages the compressor housing 30.

Figure 2:
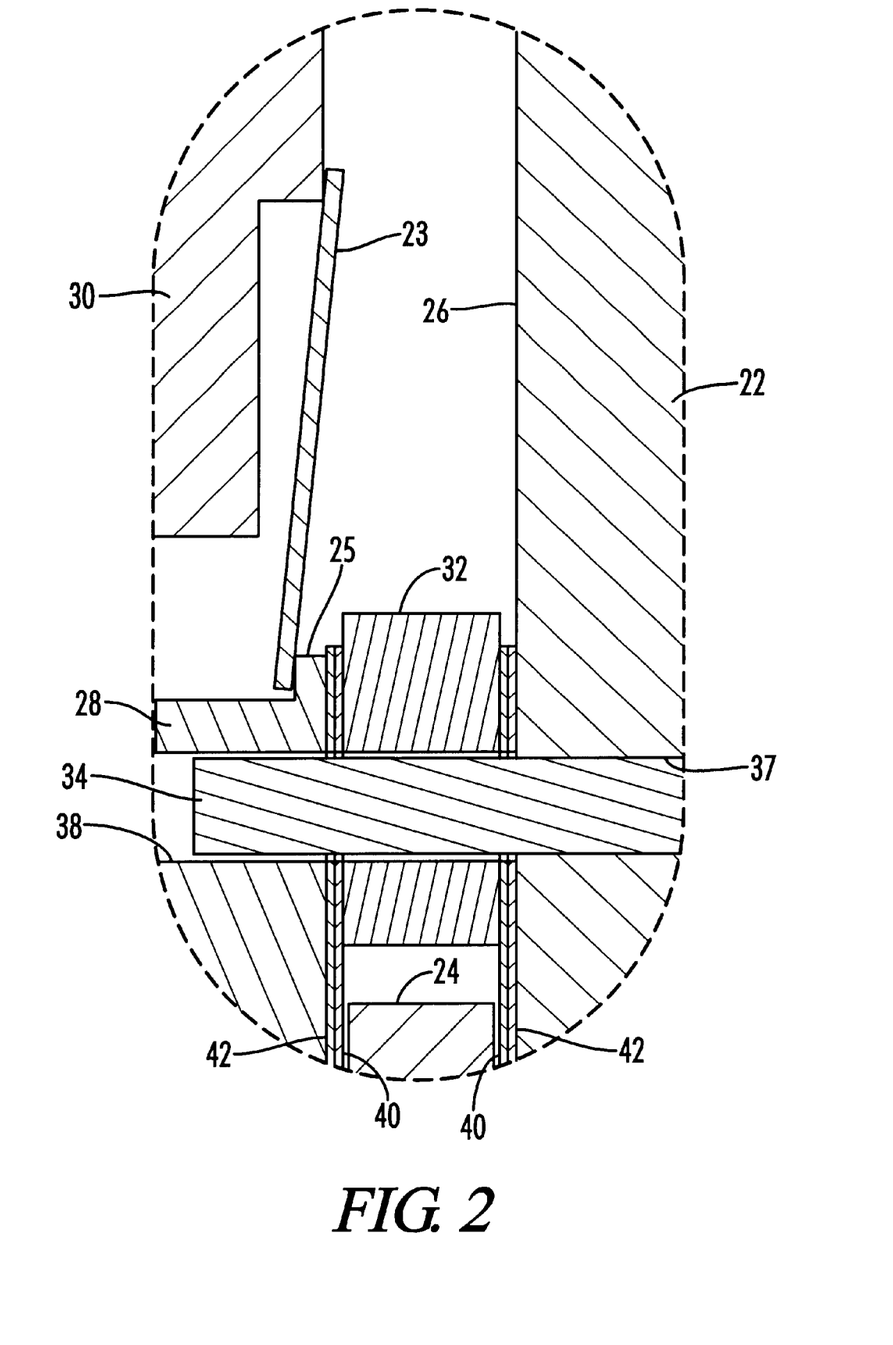
FIG. 2 is an enlarged partial view of oval 2 of FIG. 1 illustrating the thrust plate and spacer area of the fluid film thrust bearing according to the present invention.

With reference to FIG. 2, a thrust bearing spacer 32 is positioned radially outward from the thrust disk 24 of the bearing rotor 18 and is positioned radially by a plurality of circumferentially spaced pins 34 which are fixed in holes 37 in the recess 26 of the center bearing housing 22 and extend into holes 38 in the thrust bearing plate 28. Alternately, pilots could be utilized to align the various elements. A thrust bearing compliant foil member or aerofoil member 40 and thrust bearing underspring member 42 are disposed on either side of the bearing rotor thrust disk 24 and thrust bearing spacer 32. On one side, the compliant foil member 40 and underspring member 42 are positioned in the recess 26 of the center bearing housing 22 and on the other side they are adjacent to the bearing thrust plate 28. The foil member 40 and underspring member 42 are held in position radially and circumferentially by the pins 34 which extend from the center bearing housing 22, through holes in underspring member 42, through holes in aerofoil member 40, through holes in thrust bearing spacer 32, through holes in the opposite side foil member 40, holes in the opposite side underspring member 42 and into holes 38 in the bearing thrust plate 28. The bearing thrust plate 28 is biased towards the center bearing housing 22 by a Belleville washer 23 disposed between the lip 25 on the bearing thrust plate 28 and the compressor housing 30.

The thickness of the thrust bearing spacer 32 is a few thousandths of an inch greater than the thickness of the bearing rotor thrust disk 24. Variations in the foil or foil coating thicknesses inherently cause compensating variations in the spacing between the thrust plate 28 and the housing 22. Thus, variations in bearing sway space and bearing compliance due to foil thickness tolerances are prevented.

Figure 3:
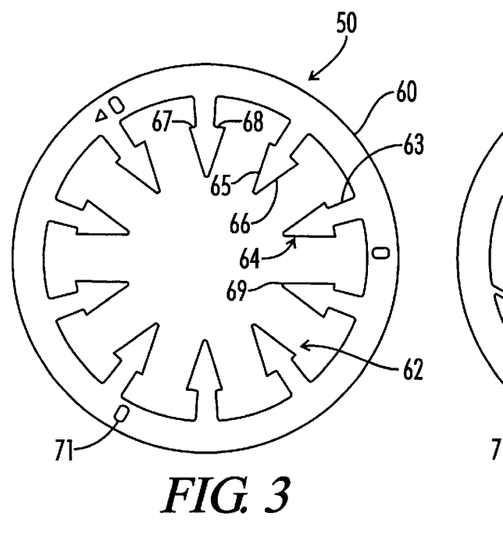
FIG. 3 is a plan view of the support element of an underspring member according to the present invention.
Figure 4:
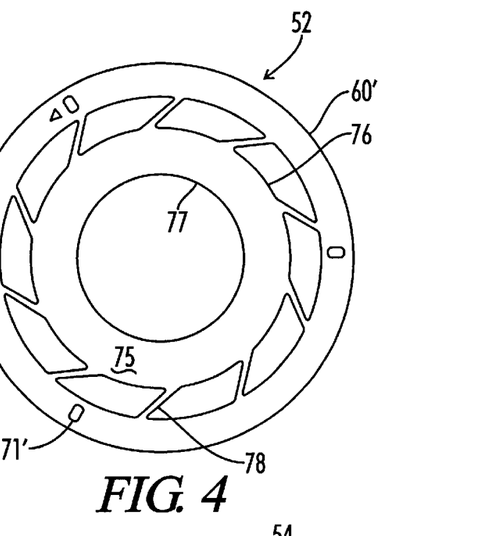
FIG. 4 is a plan view of the plate element of underspring member of the present invention.
Figure 5:
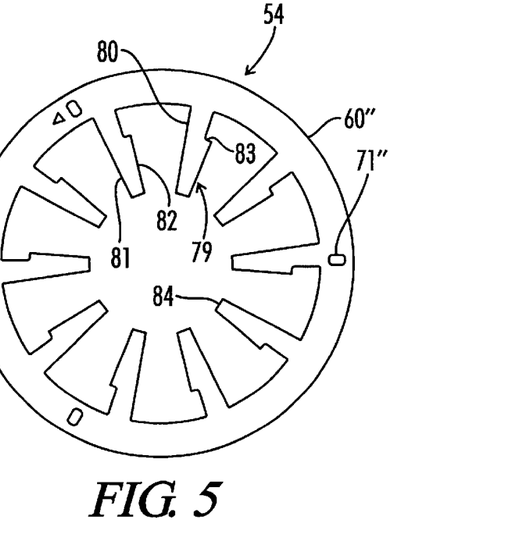
FIG. 5 is a plan view of the anvil element of underspring member according to the present invention.
Figure 6:
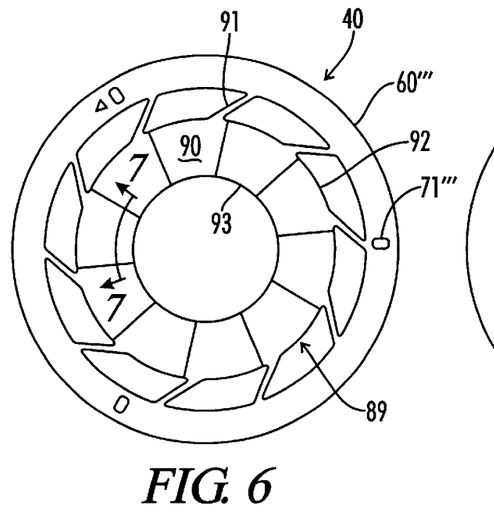
FIG. 6 is a plan view of an aerofoil member according to the present invention.

FIGS. 3–5 illustrate the three elements of the underspring member 42. These are the bottom or support element 50 (FIG. 3), the mid or plate element 52 (FIG. 4), and the top or anvil element 54 (FIG. 5). The compliant foil or aerofoil member 40 is illustrated in FIG. 6.

Each of the support element 50, plate element 52, anvil element 54 and aerofoil member 40 is formed from a single flat disk termed a foil blank from the same or different materials. They can be produced by conventional EDM techniques, by fine blanking or stamping techniques, or by chemical etching.

The support element 50 includes an outer ring 60 having a plurality of inwardly projecting supports 62. The number of supports 62 is illustrated by way of example as ten. Each support 62 includes a stem 63 and a wedge or arrow 64 having a leading edge 65 and a trailing edge 66 meeting at point 69, plus a leading edge base 67 and a trailing edge base 68. The leading edge base 67 is shorter than the trailing edge base 68 which makes the arrow 64 off centered on the stem 63. The outer ring 60 includes a plurality of round or oval aligning holes 71 (three shown).

The plate element 52 includes an outer ring 60' having similarly situated aligning holes 71'. An annular plate ring 75 is supported within the outer ring 60' by a plurality of forwardly slanted webs 78. The annular plate ring 75 has an outer diameter 76 and an inner diameter 77.

The anvil element 54 also includes an outer ring 60'' having aligning holes 71'' in the same positions as the support element 50 and plate element 52. A plurality of anvils 79 extend inward from the outer ring 60'' with a stem 80. The leading edge 81 of the anvil 79 is an extension of the stem 80 while the trailing edge 82 of the anvil 79 extends radially from the anvil base 83.

Likewise, the aerofoil member 40 includes an outer ring 60''' having aligning holes 71''' in the same spatial relationship as the three elements 50, 52, and 54 of the underspring member 42. An annular aerofoil 89 includes a plurality of pads 90, having outer diameter 92 and inner diameter 93 supported within the outer ring 60''' by a plurality of forwardly slanted webs 91.

The aligning holes 71, 71', 71'', and 71''' are equally spaced around the outer rings 60, 60', 60'', and 60''' respectively, and serve to align the elements 50, 52, 54 of the underspring member 42 and the aerofoil member 40. With this equal spacing, a primary or pivotal hole is designated to establish the proper relationship of the aligning holes of the underspring member 42 and aerofoil member 40. In addition, a triangular arrow, indicating the direction of rotation of the thrust disk, may be etched near this primary hole.

Figure 7:
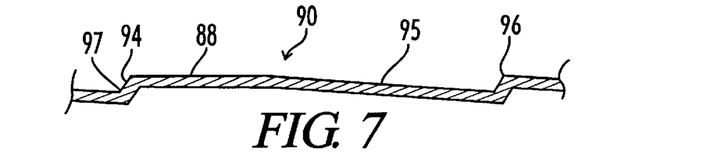
FIG. 7 is an exploded sectional view of an individual pad taken along line 7—7 of FIG. 6.

With reference to FIG. 7, the pads 90 comprise steeply sloped joggles or steps 94 to function as diverging wedge channels and gradually converging annular wedge channels including flat lands 88 and ramps 95. The pads 90 each include a leading edge 96 and a trailing edge 97.

Figure 8:
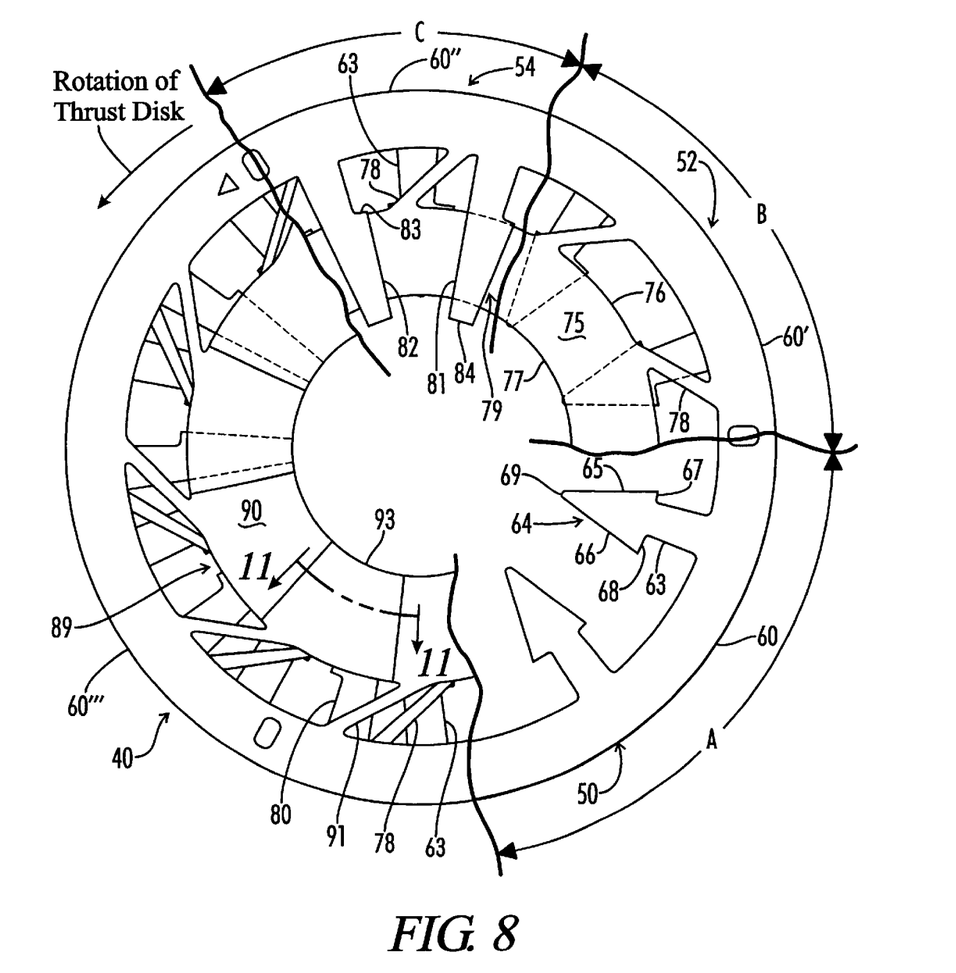
FIG. 8 is an exploded plan view of the underspring member and aerofoil member of FIGS. 3–6, with partial sectionals showing aerofoil member and elements of underspring member.

FIG. 8 is an enlarged plan view of the assembled underspring member 42 and aerofoil member 40 illustrating the relative positions of the various elements with individual elements partially broken away to show the element underneath. Arc "A" of FIG. 8 shows the support element 50 of FIG. 3 while Arc "B" shows the plate element 52 of FIG. 4 with the support element 50 underneath, partially shown in dotted lines. Arc "C" shows the anvil element 54 of FIG. 5 with both the plate element 52 and support element 50 underneath, with the remainder of FIG. 8 illustrating the aerofoil member 40 of FIG. 6 over the three elements 50, 52, and 54 of the underspring member 42.

The outer radius 76 of the plate ring 75 is slightly less than the radial dimension of the bases 67, 68 of arrow 64 of the support element 50 and the base 83 of the anvils 79 of the anvil element 54. The inner radius 77 of the plate ring 75 generally has the same radial dimension of the point 69 of arrow 64 of the support element 50. The anvils 79 are spaced between adjacent arrows 64 with the inner diameter 84 of the anvils 70 generally the same as the inner diameter 93 of the aerofoil 89. The leading edge 81 of the anvil 79 is slightly upstream from the leading edge 96 of the pads 90.

Figure 9:
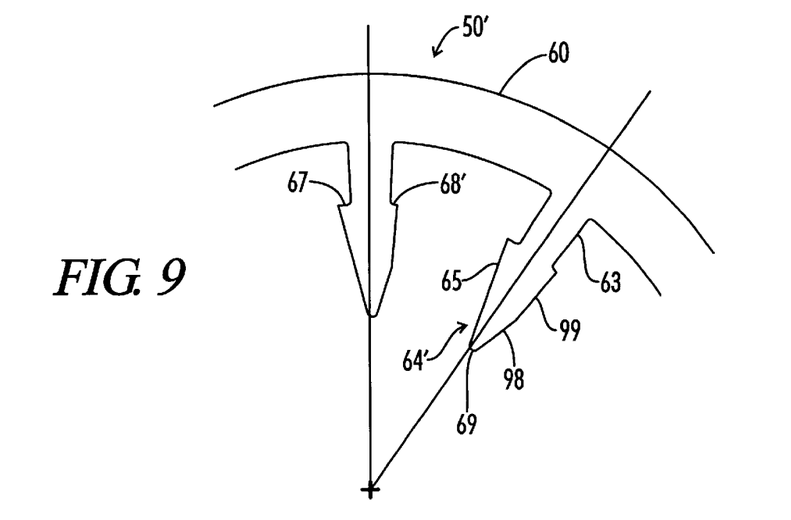
FIG. 9 is a partial plan view of an alternate support element of the underspring member of the present invention.

FIG. 9 is an illustration of an alternate support element 50' having outer ring 60. The alternate support element 50' is generally similar to the support element 50 of FIG. 3 except that the trailing edge of support 64' includes both an arrow portion 98 and a radial portion 99 which results in a shorter trailing edge base 68'. In both support element 50' and support element 50, the arrow point 69 is slightly offset upstream from the radial line through the stem 63.

Figure 10:
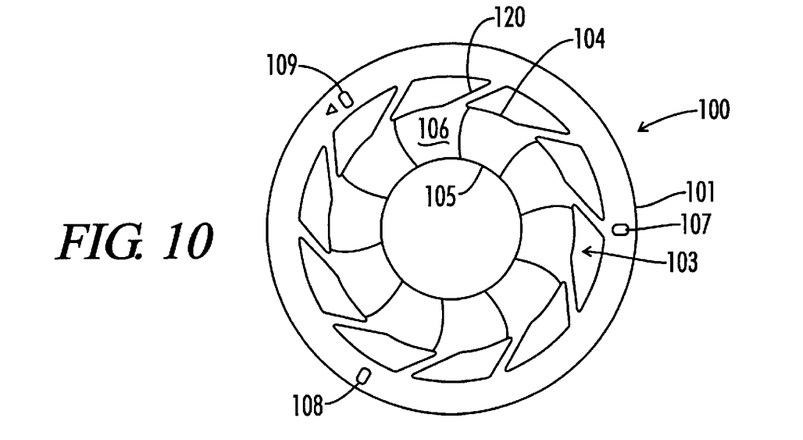
FIG. 10 is a plan view of an alternate aerofoil member of the present invention.

An alternate aerofoil member 100 is illustrated in FIG. 10. The aerofoil member 100 is generally similar to aerofoil member 40 of FIG. 6 with an outer ring 101 supporting an aerofoil 103. The aerofoil 103 includes a plurality of pads 106 having an outer diameter 104 and an inner diameter 105.

Figure 11:
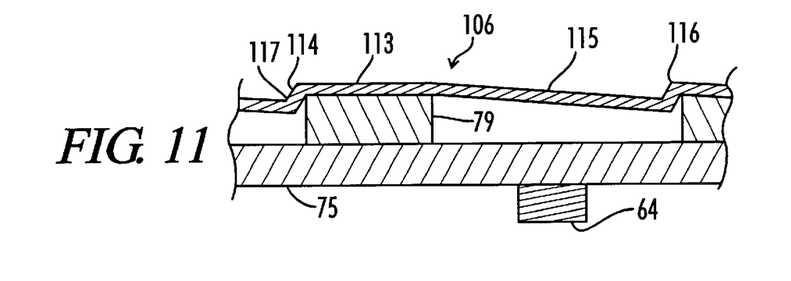
FIG. 11 is an enlarged sectional view taken along line 11—11 of FIG. 8.

As illustrated in FIG. 11, the pads 106 comprise steeply shaped joggles 114 to function as diverging wedge channels and gradually converging annular wedge channels including flat lands 113 and ramps 115, with each pad having a leading edge 116 and a trailing edge 117. As illustrated in FIG. 10, the leading edge 116 and trailing edge 117 of pads 106 can be generally curved or arcuate for added rigidity. By curving the leading and trailing edges 116, 117 of the pads 106, the structural strength of the pads can be increased and the potential deflection or deformation of the leading edges of the pads under high temperature load can be significantly reduced, this minimizes loss of load capacity. The three underspring elements are also shown with an exaggerated height beneath the aerofoil in FIG. 11 to illustrate the relative position of the pads 106 with the anvils 79, the plate 75 and the supports 64.

In the outer ring 101 of aerofoil member 100, the aligning holes 107, 108 and 109 are not equally spaced and accordingly provide a more fail-safe alignment. The circumferential distance between aligning holes 107 and 108 is less than the circumferential distance between aligning holes 107 and 109 and the circumferential distance between aligning holes 108 and 109 is less than the circumferential distance between aligning holes 107 and 108. Thus, there is only one way for the holes in the aerofoil member to be aligned with the similar holes in the underspring elements.

Figure 12:
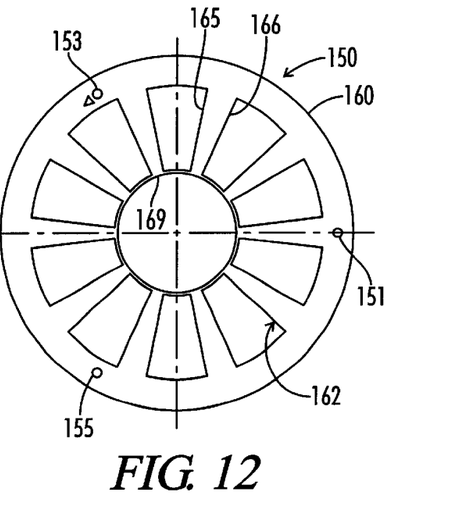
FIG. 12 is a plan view of the support element of an alternate underspring member according to the present invention.
Figure 13:
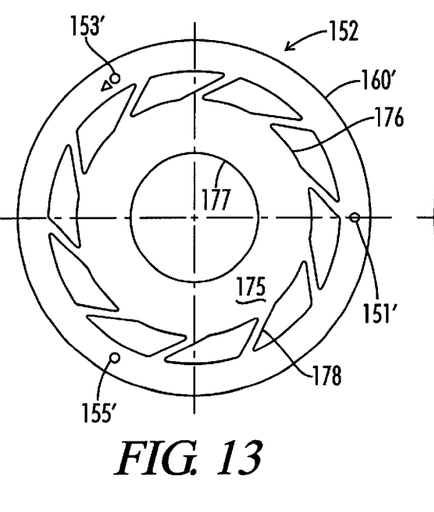
FIG. 13 is a plan view of the plate element of an alternate underspring member according to the present invention.
Figure 14:
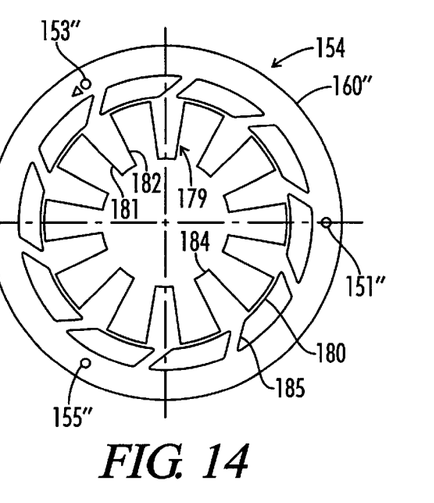
FIG. 14 is a plan view of the anvil element of an alternate underspring member according to the present invention.
Figure 15:
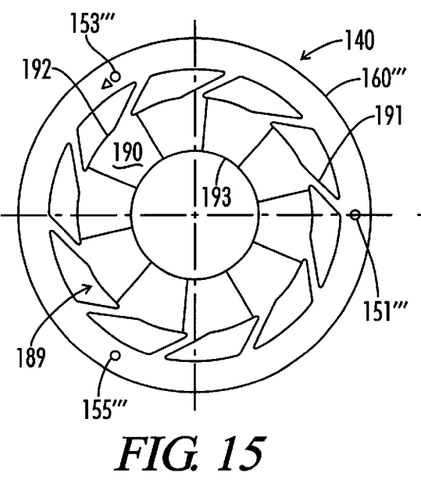
FIG. 15 is a plan view of an alternate aerofoil member of the present invention for use with the alternate underspring member of FIGS. 12–14.

FIGS. 12–14 illustrate the three elements of an alternate underspring member. These are the bottom or support element 150 (FIG. 12), the mid or plate element 152 (FIG. 13), and the top or anvil element 154 (FIG. 14). The alternate compliant foil member 140, that goes with the underspring elements 150, 152 and 154 is illustrated in FIG. 15.

The support element 150 includes an outer ring 160 having a plurality of inwardly projecting supports 162 with each support 162 generally wedge shaped changing width from a greater width at the outer ring 160 to a lesser width at the inner ring 169. Both the leading edge 165 and trailing edge 166 of the supports 162 would be generally radial. The outer ring 160 includes three unequally spaced round or oval aligning holes 151, 153, and 155.

The plate element 152 includes an outer ring 160' having similarly situated aligning holes 151', 153', and 155'. An annular plate ring 175 is supported within the outer ring 160' by a plurality of forwardly slanted webs 178 and includes an outer diameter 176 and an inner diameter 177.

The anvil element 154 also includes an outer ring 160" having aligning holes 151", is 153", and 155", in the same positions as the support element 150 and plate element 152. An annular ring 180 is supported by a plurality of forwardly slanted webs 185 which also support a plurality of inwardly projecting anvils 179. Each anvil 179 includes a generally radially extending leading edge 181 and trailing edge 182 and an inner diameter 184.

Likewise, the aerofoil member 140 includes an outer ring 160'" having aligning holes 151'", 153'", and 155'" in the same spatial configuration as the aligning holes in the three elements 150, 152, and 154 of the underspring member. An annular aerofoil 189 includes a plurality of pads 190, having outer diameter 192 and inner diameter 193 supported within the outer ring 160'" by a plurality of forwardly slanted webs 191.

Figure 16:
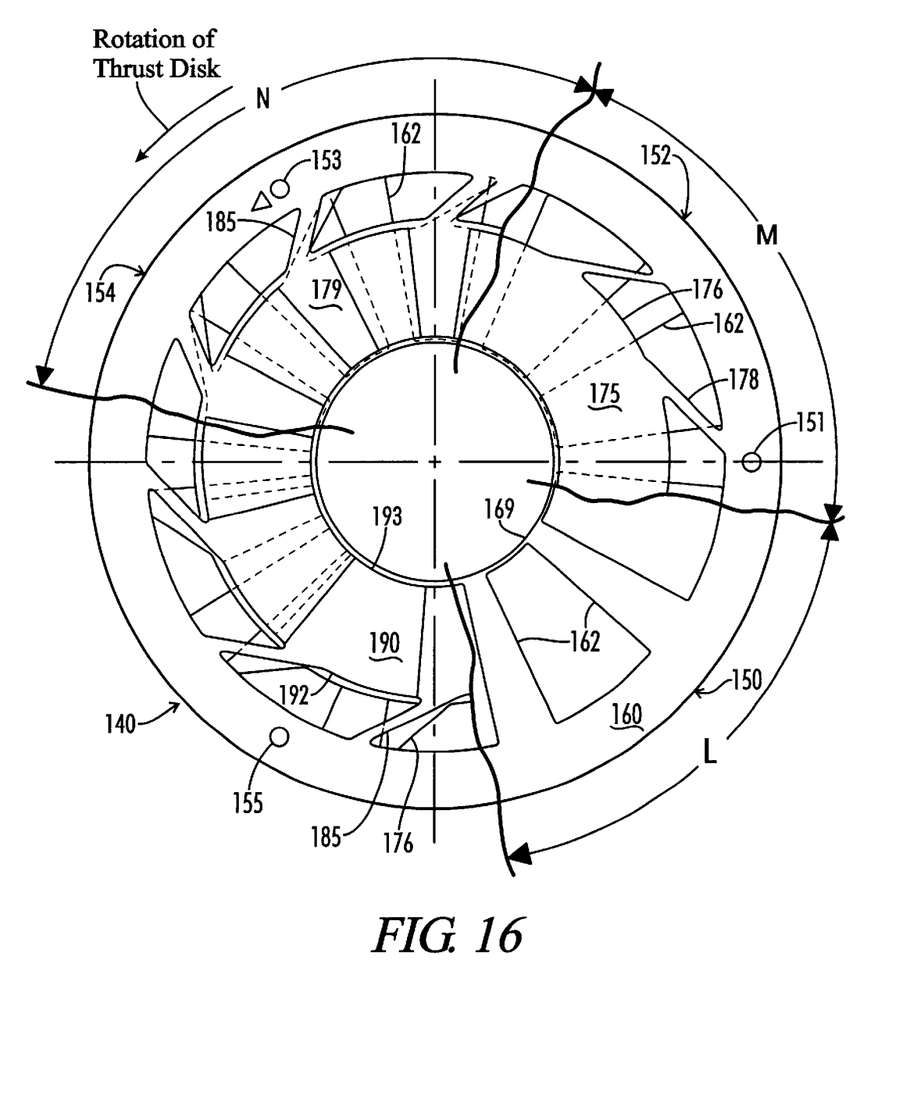
FIG. 16 is an exploded plan view of the underspring member and aerofoil member of FIGS. 12–15, with partial sectionals showing the alternate aerofoil member and elements of the alternate underspring member.

FIG. 16 is an enlarged plan view of the assembled underspring member and aerofoil member of FIGS. 12–15 illustrating the relative positions of the various elements with individual elements partially broken away to show the element underneath. Arc "L" of FIG. 16 shows the support element 150 of FIG. 12 while Arc "M" shows the plate element 152 of FIG. 13 with the support element 150 underneath, partially in dotted lines. Arc "N" shows the anvil element 154 of FIG. 14 with both the plate element 152 and support element 150 underneath, with the remainder of FIG. 16 illustrating the aerofoil member 140 of FIG. 15 over the three elements of the underspring member. As can be seen, the outer rings 160, 160', 160", and 160'" are aligned together with aligning holes therein.

The outer diameter 176 of the plate ring 175 is generally the same as the outer diameter 192 of the aerofoil 189. The anvils 179 are spaced between adjacent supports 162 and the leading edge 181 of the anvil 179 is slightly upstream from the trailing edge of the pads 190.

Figures 17, 18:
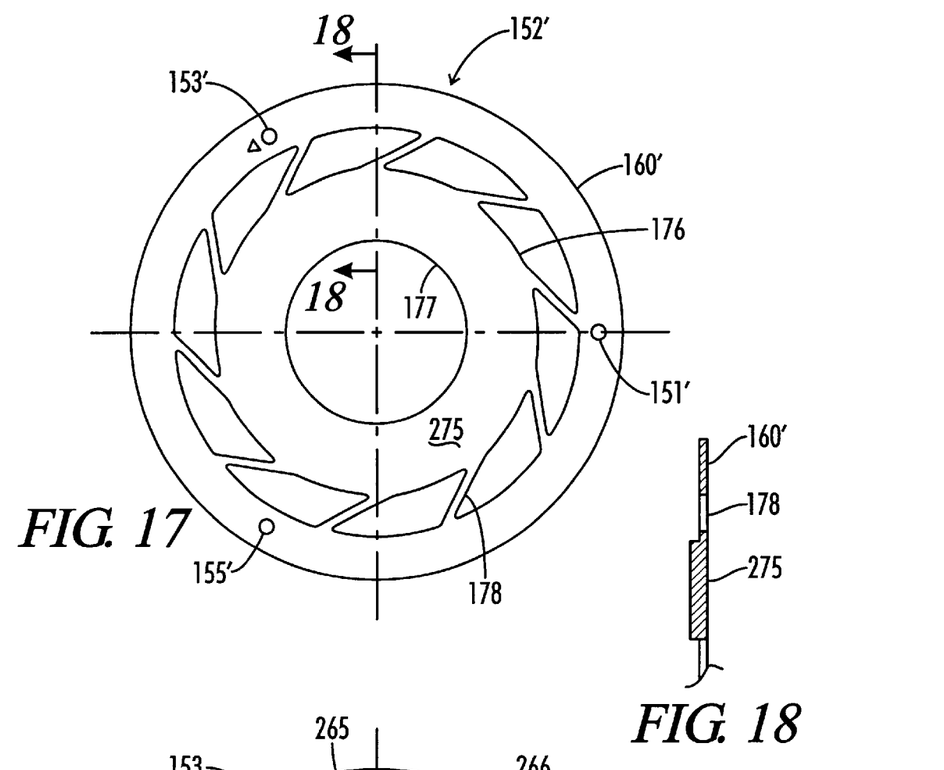
FIG. 17 is a plan view of an alternate plate element of alternate underspring member according to the present invention.
FIG. 18 is a cross sectional view of the alternate plate element of FIG. 17 taken along line 18—18.

The alternate plate element 152' of FIGS. 17 and 18 is generally identical to the underspring element 152 of FIG. 13 except for the thickness of the annular plate ring 275 which is now thicker than the rest of the underspring element 152'. By increasing the thickness of the annular plate ring 275, the stiffness of the bearing will be increased. A further alternative would be to taper the thickness of the annular plate ring 275 to have a greater thickness at the outer diameter 176 than at the inner diameter 177. This will produce a greater stiffness at the outer diameter 176 than at the inner diameter 177 to achieve a mechanical stiffness that approaches in value the hydrodynamic film stiffness which is greater at the outer diameter than the inner diameter.

Figure 19:
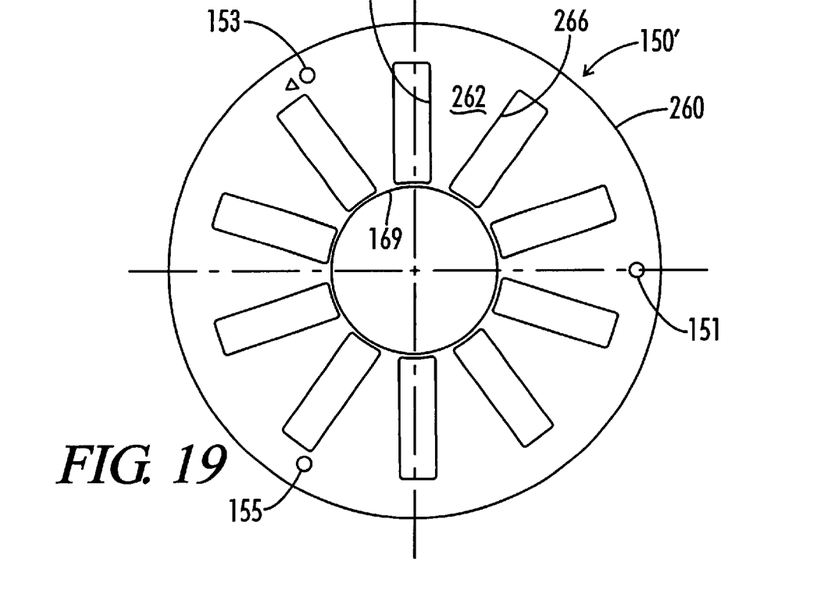
FIG. 19 is a plan view of an alternate support element of alternate underspring member according to the present invention.

The alternate support element 150' includes an outer ring 260 having a plurality of supports 262 inwardly projecting therefrom. Neither the leading edge 265 or trailing edge 266 are radial but the leading edge 265 of one support 262 is generally parallel with the trailing edge 266 of the next adjacent support. This results in a constant circumferential spring length (of any plate member) from the inner radius to the outer radius.

Figure 20:
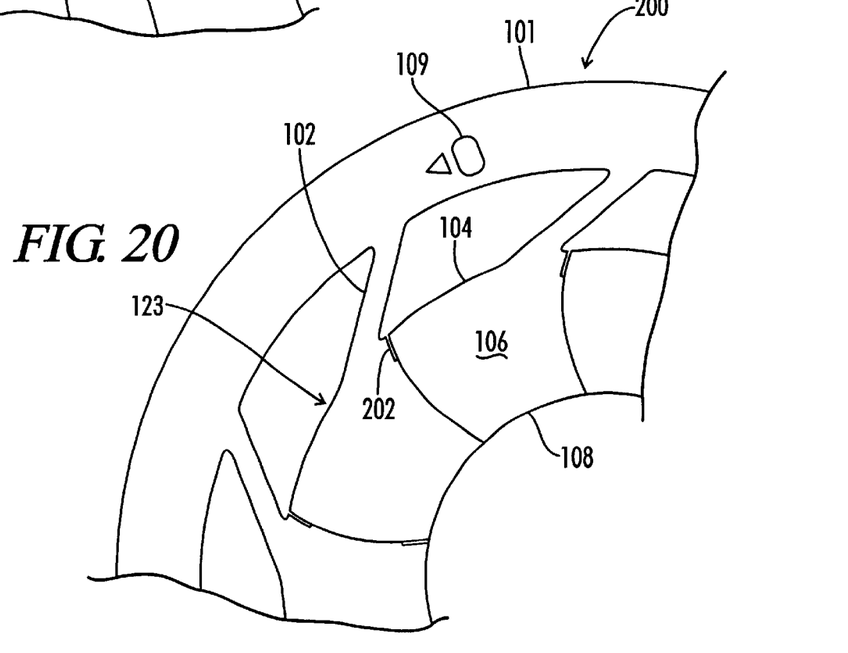
FIG. 20 is a partial plan view of another alternate aerofoil member according to the present invention.
Figure 21:
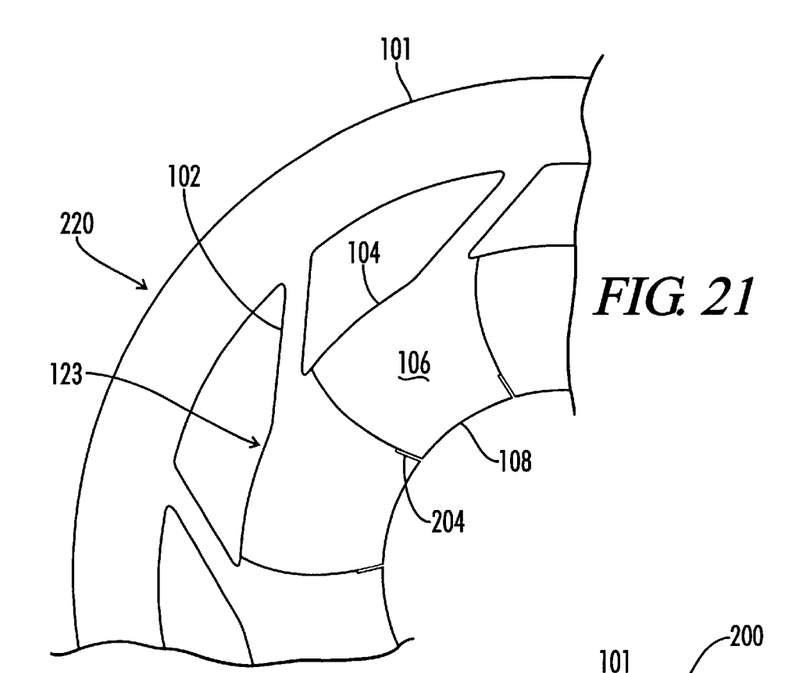
FIG. 21 is a partial plan view of yet another alternate aerofoil member according to the present invention.
Figure 22:
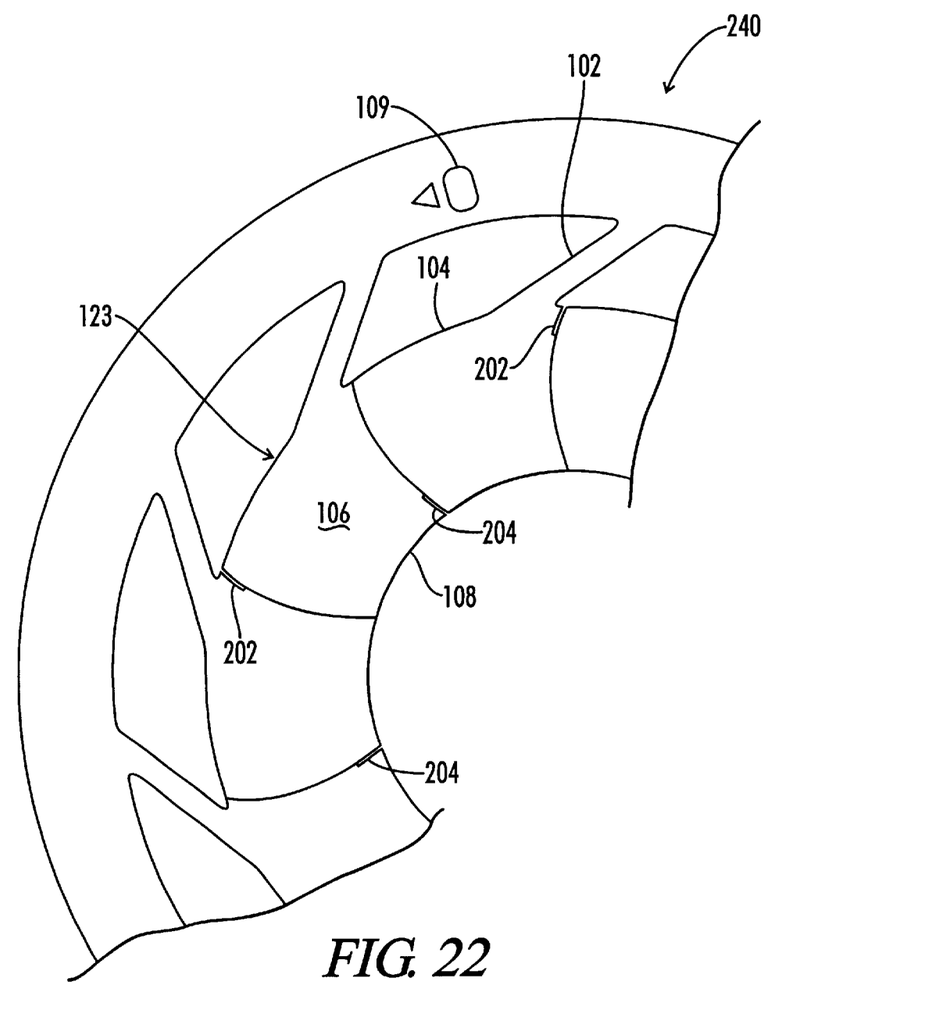
FIG. 22 is a partial plan view of still another alternate aerofoil member according to the present invention.

Three alternate aerofoil members are illustrated in FIGS. 20–22. In FIG. 20, aerofoil member 200 is identical to aerofoil member 100 of FIG. 10 except for a plurality of narrow slots 202 at the trailing edge of the pads 106 of the aerofoil 123 which extend a short distance radially inward from the outer diameter 104. The aerofoil member 220 of FIG. 21 includes a plurality of narrow slots 204 at the trailing edge of the pads 106 of the aerofoil 123 which extend radially outward a short distance from the inner diameter 108. In FIG. 22, the radially inwardly extending slots 202 alternate with the radially outwardly extending slots 204. The slots 202 and 204 minimize the deformation of the aerofoil at operating temperatures and thus prevent thermal buckling.

While specific embodiments of the invention have been illustrated and described, it is to be understood that these are provided by way of example only and that the invention is not to be construed as being limited thereto but only by the proper scope of the following claims.

What we claim is:

1. A compliant foil fluid film thrust bearing comprising:
   a thrust disk rotatably supported by a non-rotating thrust bearing surface; and
   a compliant foil thrust bearing operably disposed between said rotatable thrust disk and said non-rotating thrust bearing surface and mounted on said thrust bearing surface, said compliant foil thrust bearing including a compliant foil member and an underspring member, said underspring member mounted on said thrust bearing surface and disposed between said thrust bearing surface and said compliant foil member,
   said underspring member including means to provide variable spring stiffness to said annular compliant foil member in both the circumferential and radial directions;
   said underspring member includes three underspring elements, and further comprises:
      a support element having a plurality of shaped supports disposed within an annular outer ring mounted adjacent said non-rotating thrust bearing surface,
      a plate element having an annular plate ring disposed within an annular outer ring, said annular outer ring coextensive with the annular outer ring of said support element, and mounted next to said support element with the annular plate ring disposed over said plurality of shaped supports, and
      an anvil element having a plurality of shaped anvils disposed with an annular outer ring, said annular outer ring coextensive with the annular outer rings of said support element and said plate element, and mounted next to said plate element with said plurality of anvils disposed over said annular plate ring generally between adjacent shaped supports on the opposite side of said annular plate ring.

2. The compliant foil fluid film thrust bearing of claim 1, wherein:
   said compliant foil member includes an aerofoil supported by a plurality of forward slanting webs extending from said compliant foil member annular outer ring, each of said shaped supports of said support element is supported within said support element annular outer ring by a generally radial stem, said annular plate ring of said plate element is supported within said plate element annular outer ring by a plurality of forward-slanted webs, and each of said shaped anvils of said anvil element are supported within said anvil element annular outer ring by a generally radial stem.

3. The compliant foil fluid film thrust bearing of claim 2 wherein said shaped supports of said support element are generally arrowhead shaped and the base of each arrowhead shaped support is supported by said generally radial support element stem.

4. The compliant foil fluid film thrust bearing of claim 3 wherein said generally arrowhead shaped supports of said support element are displaced from the centerline of said stems such that the leading edge base is shorter than the trailing edge base.

5. The compliant foil fluid film thrust bearing of claim 3 wherein said generally arrowhead shaped support elements has a tapered leading edge and a partially tapered, partially radial, trailing edge such that the leading edge base is longer than the trailing edge base.

6. The compliant foil fluid film thrust bearing of claim 2 wherein the leading edge of said shaped anvils of said anvil element is a radial extension of said stem and said shaped anvils generally support the leading edge of the converging wedge channels of said compliant foil member.

7. The compliant foil fluid film thrust bearing of claim 2 wherein said shaped anvils radially inwardly decrease in width.

8. The compliant foil fluid film thrust bearing of claim 2 wherein said compliant foil member forms alternating converging and diverging wedge channels having generally radial leading and trailing edges.

9. The compliant foil fluid film thrust bearing of claim 2 wherein said compliant foil member forms alternating converging and diverging wedge channels having generally arcuate leading and trailing edges.

10. The compliant foil fluid film thrust bearing of claim 2 wherein said compliant foil member forms alternating converging and diverging wedge channels, said converging wedge channels having a leading edge and a trailing edge with the leading edge having a generally flat land and the trailing edge having a ramp from the adjacent diverging wedge channel to said generally flat land.

11. The compliant foil fluid film thrust bearing of claim 2 wherein said compliant foil member forms alternating converging and diverging wedge channels, said diverging wedge channels including a narrow radial slot extending inward from the outer diameter of said compliant foil member a short distance into the diverging wedge channel.

12. The compliant foil fluid film thrust bearing of claim 2 wherein said compliant foil member forms alternating converging and diverging wedge channels, said diverging wedge channels including a narrow radial slot extending outward from the inner diameter of said compliant foil member a short distance into the diverging wedge channel.

13. The compliant foil fluid film thrust bearing of claim 2 wherein said compliant foil member forms alternating converging and diverging wedge channels, said alternating diverging wedge channels including a narrow radial slot extending inward from the outer diameter of said compliant foil member a short distance into the diverging wedge channel and a narrow radial slot extending outward from the inner diameter of said compliant foil member a short distance into the diverging wedge channel.

14. A compliant foil fluid film thrust bearing comprising:
   a thrust disk rotatably supported by a non-rotating thrust bearing surface; and
   a compliant foil thrust bearing operably disposed between said rotatable thrust disk and said non-rotating thrust bearing surface and mounted on said thrust bearing surface, said compliant foil thrust bearing including a compliant foil member and an underspring member, said underspring member mounted on said thrust bearing surface and disposed between said thrust bearing surface and said compliant foil member, said underspring member including means to provide variable spring stiffness to said annular compliant foil member in both the circumferential and radial directions;

said underspring member includes three underspring elements, and further comprises:

a support element having a plurality of shaped supports disposed between an annular outer ring and an annular inner ring and mounted adjacent said non-rotating thrust bearing surface, a plate element having an annular plate ring within an annular outer ring supported by a plurality of forward slanted webs, said plate element annular outer ring coextensive with the annular outer ring of said support element, and said plate element mounted next to said support element with the annular plate ring disposed over said plurality of shaped supports, and an anvil element having a plurality of shaped anvils extending radially inward from an intermediate ring supported by a plurality of forward slanted webs within an annular outer ring, said anvil element annular outer ring coextensive with the annular outer rings of said support element and said plate element, and said anvil element mounted next to said plate element with said plurality of anvils disposed over said annular plate ring generally between adjacent shaped supports on the opposite side of said annular plate ring.

15. The compliant foil fluid film thrust bearing of claim 14 wherein said compliant foil member includes an aerofoil supported by a plurality of forward slanting webs extending from an annular outer ring which is coextensive with the annular outer rings of said support element, said plate element, and said anvil element, said shaped anvils generally support the leading edge of the converging wedge channels of said compliant foil member.

16. The compliant foil fluid film thrust bearing of claim 15 wherein said shaped supports of said support element have a generally radial leading edge and a generally radial trailing edge.

17. The compliant foil fluid film thrust bearing of claim 15 wherein said anvils of said anvil element have a generally radial leading edge and a generally radial trailing edge.

18. The compliant foil fluid film thrust bearing of claim 15 wherein said aerofoil has converging and diverging wedge channels having generally radial leading and trailing edges.

19. The compliant foil fluid film thrust bearing of claim 15 wherein said aerofoil has alternating converging and diverging wedge channels having generally arcuate leading and trailing edges.

20. The compliant foil fluid film thrust bearing of claim 15 wherein said aerofoil has alternating converging and diverging wedge channels, the leading edge of said converging wedge channels having a generally flat land and the trailing edge having a ramp from the adjacent diverging wedge channel to said generally flat land.

21. The compliant foil fluid film thrust bearing of claim 15 wherein said aerofoil has alternating converging and diverging wedge channels, said diverging wedge channels including a narrow radial slot extending inward from the outer diameter of said compliant foil member a short distance into the diverging wedge channel.

22. The compliant foil fluid film thrust bearing of claim 15 wherein said aerofoil has alternating converging and diverging wedge channels, said diverging wedge channels including a narrow radial slot extending outward from the inner diameter of said compliant foil member a short distance into the diverging wedge channel.

23. The compliant foil fluid film thrust bearing of claim 15 wherein said aerofoil has alternating converging and diverging wedge channels, said alternating diverging wedge channels including a narrow radial slot extending inward from the outer diameter of said compliant foil member a short distance into the diverging wedge channel and a narrow radial slot extending outward from the inner diameter of said compliant foil member a short distance into the diverging wedge channel.

24. A compliant foil fluid film thrust bearing comprising:

a bearing housing having a thrust bearing surface and a generally opposed thrust bearing plate;

a shaft rotatably supported within said bearing housing and including a thrust disk radially extending between said thrust bearing surface and said opposed thrust bearing plate;

a pair of annular compliant foil members with one of said pair of members disposed on either side of said thrust disk; and a pair of underspring members with one of said pair of underspring members disposed between an annular compliant foil member and said thrust bearing surface and the other of said pair of underspring members disposed between the other of said pair of annular compliant foil members and said thrust bearing plate and each of said annular underspring members including means to provide variable spring stiffness to said annular compliant foil member in both the circumferential and radial directions;

wherein each of said compliant foil members forms alternating converging and diverging wedge channels, said converging wedge channels having a leading edge and a trailing edge with the leading edge having a generally flat land and the trailing edge having a ramp from the adjacent diverging wedge channel to said generally flat land.

25. The compliant foil fluid film thrust bearing of claim 24 wherein each of said compliant foil members forms alternating converging and diverging wedge channels, said diverging wedge channels including a narrow radial slot extending inward from the outer diameter of said compliant foil member a short distance into the diverging wedge channel.

26. The compliant foil fluid film thrust bearing of claim 24 wherein each of said compliant foil members forms alternating converging and diverging wedge channels, said diverging wedge channels including a narrow radial slot extending outward from the inner diameter of said compliant foil member a short distance into the diverging wedge channel.

27. The compliant foil fluid film thrust bearing of claim 24 wherein each of said compliant foil members forms alternating converging and diverging wedge channels, said alternating diverging wedge channels including a narrow radial slot extending inward from the outer diameter of said compliant foil member a short distance into the diverging wedge channel and a narrow radial slot extending outward from the inner diameter of said compliant foil member a short distance into the diverging wedge channel.

28. A compliant foil member for a fluid film thrust bearing, comprising:

an annular compliant disk;

said annular compliant disk having a plurality of alternating converging and diverging wedge channels on the surface of said compliant foil member, said converging wedge channels having a leading edge and a trailing edge, with the trailing edge having a generally flat land and the leading edge having a ramp from the adjacent diverging wedge channel to said generally flat land.

29. The compliant foil fluid film thrust bearing of claim 28 wherein said alternating converging and diverging channels are formed by a plurality of converging ramps and diverging joggles.

30. The compliant foil fluid film thrust bearing of claim 28 wherein said diverging wedge channels include a narrow radial slot extending inward from the outer diameter of said compliant foil member a short distance into the diverging wedge channel.

31. The compliant foil fluid film thrust bearing of claim 28 wherein said diverging wedge channels include a narrow radial slot extending outward from the inner diameter of said compliant foil member a short distance into the diverging wedge channel.

32. The compliant foil fluid film thrust bearing of claim 28 wherein alternating diverging wedge channels include a narrow radial slot extending inward from the outer diameter of said compliant foil member a short distance into the diverging wedge channel and a narrow radial slot extending outward from the inner diameter of said compliant foil member a short distance into the diverging wedge channel.

33. The compliant foil fluid film thrust bearing of claim 28 wherein said alternating converging and diverging wedge channels have generally radial leading and trailing edges.

34. The compliant foil fluid film thrust bearing of claim 28 wherein said alternating converging and diverging wedge channels have generally arcuate leading and trailing edges.

35. A compliant foil member for a fluid film thrust bearing, comprising:

an annular compliant disk;

said annular compliant disk having a plurality of compliant foil pads forming alternating converging and diverging wedge channels on the surface of said compliant foil member, each compliant foil pad having a leading edge and a trailing edge, with the trailing edge having a generally flat land and the leading edge having a ramp from the adjacent diverging wedge channel to said generally flat land.

36. The compliant foil member for a fluid film thrust bearing of claim 35 wherein said generally flat land is less than fifty percent of said converging wedge channel.

37. The compliant foil member for a fluid film thrust bearing of claim 35 wherein said generally flat land is about one-third of said converging wedge channel.

38. A compliant foil fluid film thrust bearing comprising:

a thrust disk rotatably supported by a non-rotating thrust bearing surface;

a compliant foil thrust bearing operably disposed between said rotatable thrust disk and said non-rotating thrust bearing surface and mounted on said thrust bearing surface, said compliant foil thrust bearing including a compliant foil member having a plurality of converging ramps and diverging joggles to form alternating converging and diverging wedge channels on the surface of said compliant foil member facing said rotatable thrust disk, said converging wedge channels having generally arcuate leading and trailing edges, with the leading edge having a generally flat land and the trailing edge having a ramp from the adjacent diverging wedge channel to said generally flat land, and an underspring member mounted on said thrust bearing surface and disposed between said thrust bearing surface and said compliant foil member, said underspring member including means to provide variable spring stiffness to said annular compliant foil member in both the circumferential and radial directions and including three underspring elements, a support element having a plurality of shaped supports disposed within an annular outer ring mounted adjacent said non-rotating thrust bearing surface, a plate element having an annular plate ring disposed within an annular outer ring, said annular outer ring coextensive with the annular outer ring of said support element, and mounted next to said support element with the annular plate ring disposed over said plurality of shaped supports, and an anvil element having a plurality of shaped anvils disposed with an annular outer ring, said annular outer ring coextensive with the annular outer rings of said support element and said plate element, and mounted next to said plate element with said plurality of anvils disposed over said annular plate ring generally between adjacent shaped supports on the opposite side of said annular plate ring.

39. The compliant foil fluid film thrust bearing of claim 38 wherein said diverging wedge channels include a narrow radial slot extending inward from the outer diameter of said compliant foil member a short distance into the diverging wedge channel.

40. The compliant foil fluid film thrust bearing of claim 38 wherein said diverging wedge channels include a narrow radial slot extending outward from the inner diameter of said compliant foil member a short distance into the diverging wedge channel.

41. The compliant foil fluid film thrust bearing of claim 38 wherein alternating diverging wedge channels include a narrow radial slot extending inward from the outer diameter of said compliant foil member a short distance into the diverging wedge channel and a narrow radial slot extending outward from the inner diameter of said compliant foil member a short distance into the diverging wedge channel.

42. The compliant foil fluid film thrust bearing of claim 38 wherein said aerofoil is supported by a plurality of forward slanting webs extending from said compliant foil member annular outer ring, each of said shaped supports of said support element is supported within said support element annular outer ring by a generally radial stem, said annular plate ring of said plate element is supported within said plate element annular outer ring by a plurality of forward slanted webs, and each of said shaped anvils of said anvil element are supported within said anvil element annular outer ring by a generally radial stem.

* * * * *